United States Patent [19]

Kitakami et al.

[11] Patent Number: 5,543,221
[45] Date of Patent: Aug. 6, 1996

[54] MAGNETIC RECORDING MEDIUM

[75] Inventors: Osamu Kitakami, Toride; Hideo Fujiwara, Ibaraki-ken; Yoichi Ogawa, Noda, all of Japan

[73] Assignee: Hitachi Maxell, Ltd., Osaka, Japan

[21] Appl. No.: 62,327

[22] Filed: May 17, 1993

Related U.S. Application Data

[63] Continuation of Ser. No. 771,539, Oct. 7, 1991, abandoned, which is a continuation of Ser. No. 246,731, Sep. 20, 1988, abandoned.

[30]    Foreign Application Priority Data

Sep. 21, 1987  [JP]  Japan .................................. 62-236883
Sep. 21, 1987  [JP]  Japan .................................. 62-236884
Mar. 11, 1988  [JP]  Japan .................................. 63-57918

[51] Int. Cl.$^6$ .................................. G11B 5/66; B32B 5/16
[52] U.S. Cl. .................. 428/332; 428/336; 428/694 R; 428/694 T; 428/694 TS; 428/694 TM; 428/900
[58] Field of Search .................................. 428/694, 900, 428/336, 694 R, 694 T, 694 TS, 694 TM, 332

[56]    References Cited

U.S. PATENT DOCUMENTS

| 4,210,946 | 7/1980 | Iwasaki et al. .................. 360/131 |
| 4,711,810 | 12/1987 | Ando et al. .................. 428/336 |

FOREIGN PATENT DOCUMENTS

| 0093838 | 2/1983 | European Pat. Off. . |
| 0178685 | 10/1985 | European Pat. Off. . |
| 57-117122 | 7/1982 | Japan . |
| 41428 | 5/1983 | Japan . |
| 33628 | 6/1984 | Japan . |
| 59-127235 | 7/1984 | Japan . |
| 191130 | 10/1984 | Japan . |
| 59-191130 | 10/1984 | Japan . |
| 172162 | 2/1985 | Japan . |
| 203222 | 4/1985 | Japan . |
| 221829 | 4/1985 | Japan . |
| 60-239916 | 11/1985 | Japan . |
| 61-8719 | 1/1986 | Japan . |
| 217522 | 3/1986 | Japan . |
| 239916 | 4/1986 | Japan . |
| 61-204814 | 9/1986 | Japan . |
| 145530 | 6/1987 | Japan . |

OTHER PUBLICATIONS

"Noise from Underlayer of Perpendicular Magnetic Recording Medium", Y. Uesaka et al, Journal of Applied Physics 57, p. 3925, Apr. 15, 1985.

*Primary Examiner*—Leszek Kiliman
*Attorney, Agent, or Firm*—Birch, Stewart, Kolasch & Birch, LLP

[57]    ABSTRACT

There is disclosed a magnetic recording medium comprising a non-magnetic substrate, a soft magnetic layer formed on the substrate, with or without a non-magnetic sublayer interposed therebetween, and a perpendicular magneto-anisotropic recording layer laminated on the soft magnetic layer, with or without a non-magnetic intermediate layer therebetween, the soft magnetic layer being composed of material saturation magnetization thereof being higher than at least that of the recording layer, and whose thickness is in the range of from 50 to 1,000 Å.

12 Claims, 6 Drawing Sheets

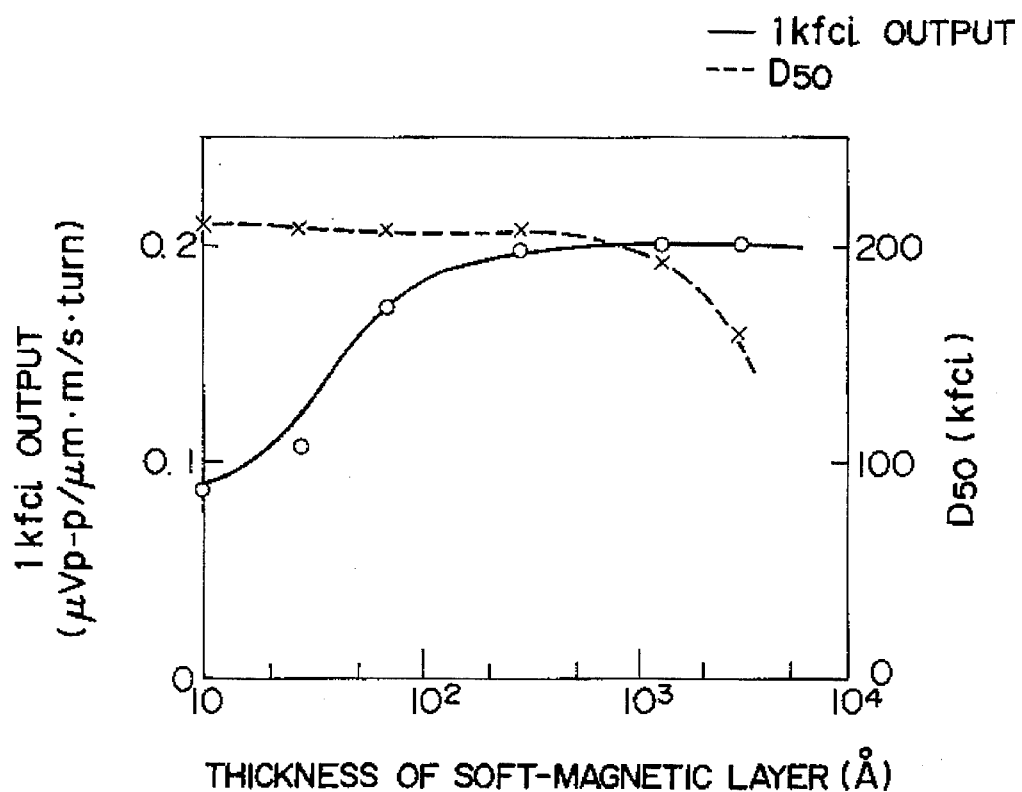
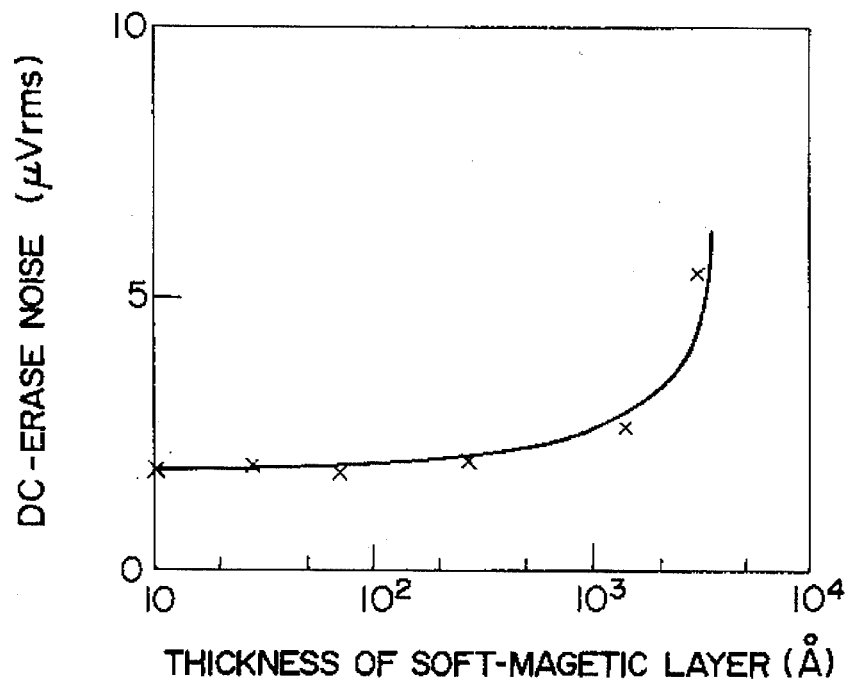
FIG. 12

THICKNESS OF Ni-Fe SOFT-MAGNETIC LAYER (Å)

MAGNETIC RECORDING MEDIUM

This application is a continuation of application Ser. No. 07/771,539 filed on Oct. 7, 1991, now abandoned, which is a continuation of Ser. No. 07/246,731 filed on Sep. 20, 1988, now abandoned.

BACKGROUND OF THE INVENTION

1. Field of Industrial Utilization

This invention relates to a magnetic recording medium and more particularly, it relates to a magnetic recording medium which shows a high output in a broad range of recording density.

2. Discussion of Related Art

The increasing demand for high-density recording has prompted the research into various new recording systems. Especially in the field of magnetic recording, the vertical magnetic recording system is deemed as one of the most promising high-density recording methods and enthusiastic studies are being made on this system. As the material of recording media used for such vertical magnetic recording, there have been proposed Co—Cr alloy film, which is most highly prized, Co—O film, Fe—M—O films (M representing Sn, Ge, etc.), and the films in which Fe or other elements have been electrodeposited in fine pores of anodized aluminum, and the results of many tests and experiments have verified their excellent high-density recording performance.

The vertical recording system using such magnetic media is indeed excellent in high-density recording characteristics as mentioned above, but on the other hand this system has the problem that it is low in low-density recording output as compared with the conventional longitudinal recording system.

This is attributable to the fact that a strong demagnetizing field is generated by the free magnetic pole formed on the rear side of the film when the vertical recording medium is magnetized, and such strong demagnetizing field acts to attenuate recording magnetization. Therefore, it should be an effective measure against such a problem to interpose a soft magnetic layer between the vertical magnetized recording layer and the substrate so as to reduce the activity of the free magnetic pole at the interface adjoining the soft magnetic layer. This concept has already been disclosed in U.S. Pat. No. 4,210,946, and further studies are being made on this double-layer film recording medium.

This type of recording medium, however, has had some difficult problems. Firstly, when a vertical magnetically anisotropic recording layer, such as a Co—Cr film, is formed on the soft magnetic layer, such as a permalloy layer, the crystal orientation of the Co—Cr film would be disturbed. Secondly, as disclosed by Uesaka et al in Journal of Applied Physics, 57, 3925 (1985), spike noise is produced in the soft magnetic layer to make it unable to obtain a good S/N ratio. Thirdly, in case the double-layer film recording medium is used in combination with a ring head, the head magnetic field in the vertical direction becomes broad due to the presence of the soft magnetic layer, resulting in the deteriorated high-density recording performance.

SUMMARY OF THE INVENTION

The present invention has for its object to solve the problem of low reproducing output of the conventional vertical recording media and to provide a perpendicular magnetic recording medium which shows a high reproducing output in the broad range of recording density.

It has been found that the object could be attained by providing a magnetic recording medium comprising a non-magnetic substrate, a soft magnetic layer formed on the substrate with or without a non-magnetic sublayer interposed therebetween, and a vertical magneto-anisotropic recording layer formed on the soft magnetic layer with or without a non-magnetic intermediate layer therebetween, in which the layers are made of materials selected such that the saturation magnetization of the soft magnetic layer will be higher than at least that of the vertical magneto-anisotropic recording layer, and the thickness of the soft magnetic layer is in the range of from 50 to 1000 Å. The present invention was achieved on the basis of such findings. In the specification and the accompanying claims, the term "in-plane magnetization film" is defined as the magnetic film whose in-plane squareness ratio is larger than that of perpendicular direction.

BRIEF DESCRIPTION OF THE DRAWINGS

FIG. 11 includes characteristic curves showing the soft magnetic layer thickness dependency of the low-density output and high-density recording performance index $D_{50}$ in the magnetic recording medium of Example 2.

FIG. 12 is a characteristic curve showing the soft magnetic layer thickness dependency of DC erase noise in the magnetic recording medium of Example 2.

DETAILED DESCRIPTION OF PREFERRED EMBODIMENTS

In the present invention, it is possible to use all of the materials showing soft magnetic characteristics for forming the soft magnetic layer, but it is usually preferred to use a Ni—Fe (permalloy) film or a Co or Co—M alloy film with M representing an element selected from the group consisting of Cr, Ge, Mo, Os, Pt, Re, Ru, Sb, Si, Ta, V, W and Zn.

In the case of using a Co—M alloy as the material for forming the soft magnetic layer, the content of the element M in the Co—M alloy should be in the range of 2 to 20 atomic %, and when M is Cr, the content of Cr is preferably not greater than 12 atomic %.

The thickness of the soft magnetic layer is preferably in the range of 50 to 500 Å.

The soft magnetic layer may be composed of a Co—Cr alloy in which the Cr content is not greater than 12 atomic %. In this case, the perpendicular magnet-anisotropic recording layer laminated on the soft magnetic layer is composed of a Co—Cr alloy with a Cr content of from 15 to 25 atomic % and has a thickness preferably in the range of 500 to 3,000 Å. The saturation magnetization of the Co—Cr alloy soft magnetic layer with a Cr content not exceeding 12 atomic % is greater than the saturation magnetization of the vertical magneto-anisotropic recording layer made of a Co—Cr alloy with a Cr content of 15 to 25 atomic %.

A non-magnetic intermediate layer with a thickness not exceeding 300 Å may be interposed between the soft magnetic layer and vertical magneto-anisotropic recording layer.

Such a non-magnetic intermediate layer may be composed of a single element selected from B, C, Ge, Mo, Si, Os, Ru, Re, Ta, Ti and W, or an alloy, oxide or nitride of these elements.

Also, if necessary, a non-magnetic sublayer may be provided between the non-magnetic substrate and the soft magnetic layer. Such a non-magnetic sublayer may be composed of anodized aluminum, Ni—P or the same materials as used for forming the non-magnetic intermediate layer. The thickness of the non-magnetic sublayer is variable over a wide range according to the type of the non-magnetic substrate and the purpose of use of the recording medium. For instance, in the case of hard discs, the non-magnetic sublayer thickness is less than 10 μm, but generally it is less than 5000 Å.

Figure 1:
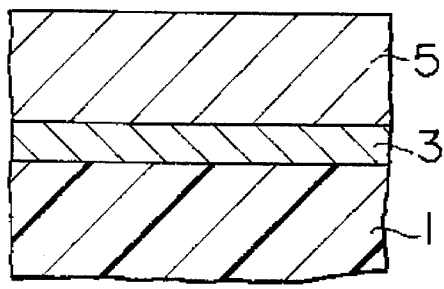
FIGS. 1 to 4 are partial schematic illustrations showing the sectional structures of the embodiments of magnetic recording medium according to this invention.
Figure 2:
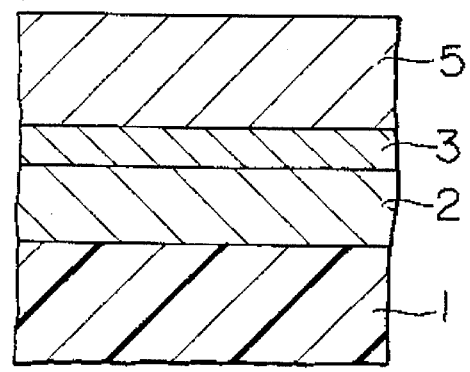
Figure 3:
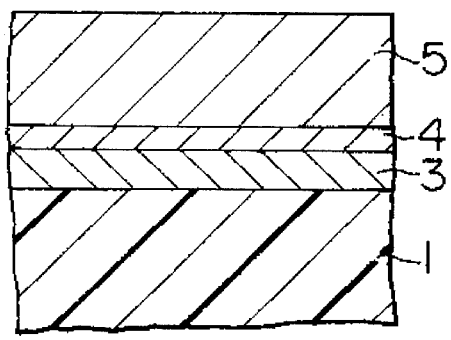
Figure 4:
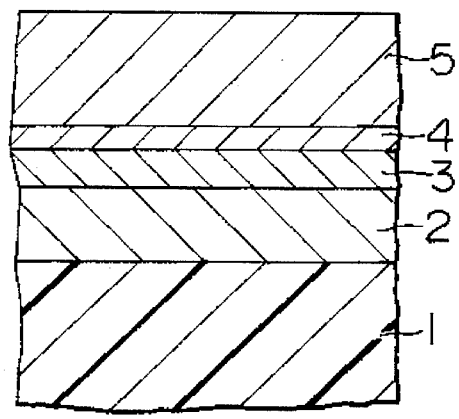

The magnetic recording medium according to the present invention may have the structures such as shown in FIGS. 1 to 4. Illustrated in FIG. 1 is an example of magnetic recording medium of this invention where neither a non-magnetic sublayer nor a non-magnetic intermediate layer is provided. In this recording medium, a soft magnetic layer 3 is laminated on a non-magnetic substrate 1, and a vertical magneto-anisotropic recording layer 5 is laminated on the soft magnetic layer. FIG. 2 illustrates a magnetic recording medium having a non-magnetic sublayer. In this recording medium, a non-magnetic sublayer 2 is laminated on a non-magnetic substrate 1, and a soft magnetic layer 3 and a perpendicular magneto-anisotropic recording layer 5 are laminated successively on the non-magnetic sublayer 2. FIG. 3 illustrates the structure of a magnetic recording medium having a non-magnetic intermediate layer, in which a soft magnetic layer 3 is laminated on a non-magnetic substrate 1, and a vertical magneto-anisotropic recording layer 5 is laminated on the soft magnetic layer 3 with a non-magnetic intermediate layer 4 interposed therebetween. Shown in FIG. 4 is the structure of a magnetic recording medium having both a non-magnetic sublayer and a non-magnetic intermediate layer. In this recording medium, a non-magnetic sublayer 2 is laminated on a non-magnetic substrate 1, and a soft magnetic layer 3, a non-magnetic intermediate layer 4 and a vertical magneto-anisotropic recording layer are further laminated in that order on the non-magnetic sublayer 2.

Figure 5:
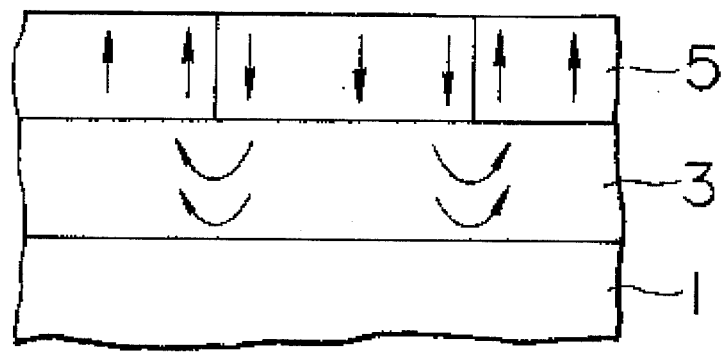
FIG. 5 is a schematic drawing for illustrating the state of magnetization in a magnetic recording medium according to this invention.

The reasons why the magnetic recording medium of this invention can yield a high reproducing output will be explained below with reference to FIG. 5 although the explanation is based on conjecture since the exact mechanism is not yet completely clear.

When the vertical magneto-anisotropic recording layer 5 is magnetized as shown in the drawing, a strong stray field is generated especially in the magnetization transition region. This accordingly regulates magnetization of the soft magnetic layer 3 in the magnetization transition region, inducing a closing tendency of the magnetic fluxes in the region, notwithstanding the small thickness of the soft magnetic layer. Thus, although residual magnetization in the transition region increases sharply with decrease of the demagnetizing field, residual magnetization is reduced in the area around the bit center since the free magnetic pole is not so much lost in such area. In view of the fact that the reproducing output is governed by the amount of residual magnetization in the magnetization transition region, it can readily be imagined that high residual magnetization, namely high reproducing output would be obtained in this recording medium even if the soft magnetic layer is small in thickness.

The state of magnetization in a conventional double-layer film recording medium is described below with reference to FIG. 6.

Figure 6:
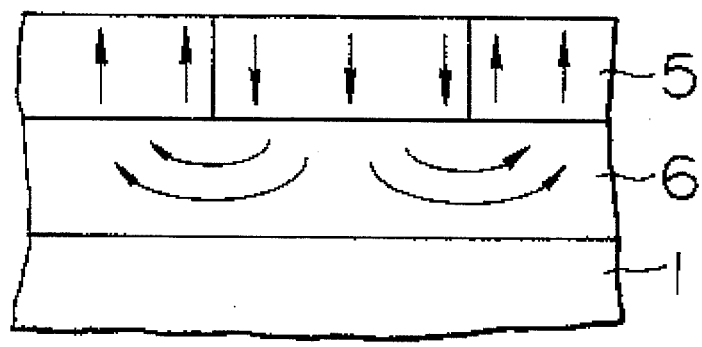
FIG. 6 is a schematic drawing for illustrating the state of magnetization in a conventional double-layer film magnetic recording medium.

When a soft magnetic sublayer 6 is interposed between the non-magnetic substrate 1 and the perpendicular magneto-anisotropic recording layer 5, the magnetic fluxes are closed as indicated by arrows in FIG. 6 and the free magnetic pole generated on the rear side of the recording layer completely disappears due to the presence of the sublayer 6, so that residual magnetization in the bits is almost uniformly recovered as a whole and there occurs no residual magnetization enhancing action in the specific region alone. In this case, ideally speaking, the soft magnetic sublayer 6 is required to have a sufficient flux density and thickness to allow passage of the magnetic fluxes leaking from the vertical recording layer 5. Therefore, it can be simply reasoned that the higher the saturated magnetic flux density of the soft magnetic material used and the greater the thickness of its layer, the more desirable for attaining the object, that is, for obtaining higher reproducing output. Based partly on such a concept, the thickness of the soft magnetic sublayer in the conventional double-layer film recording media has been set to a rather high level.

However, the experiments conducted by the present inventors disclosed that when the thickness of the soft magnetic sublayer is increased, the perpendicular magneto-anisotropic recording layer formed thereon is deteriorated in its properties and also the noise from the soft magnetic sublayer is increased, while the reproducing output reaches a saturation when the thickness of the soft magnetic layer becomes greater than a certain fixed value. It was thus confirmed that the thickness of the soft magnetic sublayer need not be made greater than a certain level from the viewpoint of reproducing output of the recording medium; any increase of the layer thickness above this level only leads to a deterioration of the perpendicular magnetization characteristics of the recording layer, resulting in a reduced high-density recording performance, and an increase of noise level, and no noticeable merit is obtained.

This fact is reflected in the specification of the soft magnetic layer in the magnetic recording medium of this invention, that is, an excellent high-density recording medium with a high output level can be obtained when saturation magnetization of the soft magnetic layer is higher than that of at least the perpendicular magneto-anisotropic recording layer and the thickness of the soft magnetic layer is in the range of from 50 to 1000 Å.

Saturation magnetization of the soft magnetic layer needs to be only slightly higher than that of the perpendicular recording layer. Any greater difference of saturation magnetization between the two layers provides no significant difference in a reproducing output improving effect.

When the thickness of the soft magnetic layer is less than 50 Å, the reproducing output is reduced. This is probably because a continuous film can not be formed with such a thickness and the film has a so-called island structure. When the layer thickness exceeds 1000 Å, the noise level increases although the output is saturated, and when a polycrystal film, such as a Co—Cr perpendicular magneto-anisotropic film is formed on the layer, the perpendicular orientability of the principal axis of crystal is greatly disturbed. This is probably for the reason that when the thickness becomes greater than 1000 Å, the soft magnetic layer comes to have its own crystallinity so strong as to disturb the perpendicular orientability of the perpendicular magneto-anisotropic polycrystal oriented film. The preferred range of thickness of the soft magnetic layer is from 50 to 500 Å.

It is not definitely known why a reduction of noise can be attained by drastically decreasing the thickness of the soft magnetic layer as compared with the conventional layer thickness of several thousand Å, but it is considered that this has a close relation with the state of the magnetic domain wall as evidenced from the following fact. In the films that create a large noise, there was observed the presence of the Bloch wall almost without exception, whereas in the soft magnetic films having a thickness from 50 to 500 Å, the preferred range of film thickness in the present invention, there was observed the other magnetic domain walls than the Bloch wall, namely Neel wall and wedge-type wall.

When a non-magnetic intermediate layer is interposed between the soft magnetic layer and the perpendicular magneto-anisotropic recording layer, the crystal orientability of the perpendicular recording layer is improved. This effect is intensified as the thickness of the soft magnetic layer is reduced. However, when the thickness of the soft magnetic layer exceeds 500 Å, it becomes difficult to restore the orientability of the perpendicular recording layer to a preferred level unless the thickness of the non-magnetic intermediate layer is increased to a substantial extent.

Investigations of the influence of such non-magnetic intermediate layer on reproducing output level showed that no large drop of output occurs if the thickness of the intermediate layer is less than 300 Å. As for the material of the non-magnetic intermediate layer, the best material to be used is decided according to the material of the soft magnetic layer formed beneath the intermediate layer and the material of the perpendicular magneto-anisotropic recording layer formed on the intermediate layer, but the use of a single element selected from B, C, Ge, Mo, Si, Os, Ru, Re, Ta, Ti and W or an alloy, oxide or nitride of any combination of these elements could produce an excellent orientation controlling layer.

The vertical magneto-anisotropic recording layer can be composed of a single ferromagnetic metal element such as Co, Ni, Fe, etc., or an alloy of these elements or an alloy of any of these elements and other suitable elements. Other metals are also usable.

The magnetic recording medium of the instant invention has the problem that the soft magnetic layer, because of its small thickness, tends to become saturated with the magnetic flux generated from the magnetic head. Therefore, the recording sensitivity is slightly lowered as compared with the conventional double-layer film recording medium, but such problem is a matter of no significance for practical use.

The magnetic recording medium of this invention is not suited for a magnetic head of the type that sharpens the recording magnetic field like an auxiliary magnetic pole exciting type thin-film head, but in application to other types of magnetic head, especially bulk type head, bulk type ring head or one-side access type thin-film head, owing to the nature of the soft magnetic layer that it tends to saturate, there is caused no disturbance of the head magnetic field due to the presence of the soft magnetic layer and it is possible to realize excellent perpendicular magnetic recording even to a high-density recording region like a perpendicular magnetic recording single-layer medium.

When a Co—Cr film with a Cr content less than 12 atomic % is used as the soft magnetic layer, the Co—Cr perpendicular magneto-anisotropic layer formed on the soft magnetic layer suffers from no large disturbance of its crystal orientation. When the Cr content in the Co—Cr alloy constituting the soft magnetic layer is below 12 atomic %, the saturation magnetization is very high and also an in-plane magnetized film having an in-plane coercive force of 10 to 300 Oe can be formed stably with no need of applying any specific working step. These properties combined serve for decreasing the amount of free magnetic pole on the rear side of the perpendicular magneto-anisotropic layer formed on the soft magnetic layer while increasing the perpendicular component of recording magnetization.

The Co—Cr perpendicular magneto-anisotropic layer provided on the Co—Cr soft magnetic layer is preferably one in which the Cr content is 15 to 25 atomic % and whose thickness is in the range of 500 to 3,000 Å. The reason for defining the Cr content in the range of 15 to 25 atomic % is that when it is less than 15 atomic % the crystallographic orientation of the Co—Cr film is deteriorated to suppress the coercive force in the perpendicular direction, and when the Cr content exceeds 25 atomic %, the saturation magnetization of the film is reduced to induce a drop of reproducing output.

Also, when the thickness of the Co—Cr vertical magneto-anisotropic layer is less than 500 Å, the reproducing output of the recording medium is reduced, and when it exceeds 3,000 Å, it becomes impossible to effect recording to the bottom of the recording layer due to the limit of capacity of the magnetic head, and the overwrite characteristics deteriorate.

A Co—M film, M representing one element selected from the group consisting of Ge, Mo, Os, Pt, Re, Ru, Sb, Si, Ta, V, W and Zn, can be used as the soft magnetic layer in the magnetic recording medium of this invention. The alloys of these elements have a high hcp phase to fcc phase transition temperature in the Co-rich region, so that when a thin film is produced from such alloys by an ordinary film forming method (vacuum deposition, sputtering, etc.), there can be obtained a film having a stable hcp structure.

According to the present studies, the film of the materials takes an hcp structure in which the C-axis is oriented in the direction vertical to the film surface, and when viewed from the aspect of magnetic properties, it becomes an in-plane magnetized film with a low coercive force. When a Co—Cr film is formed on a soft magnetic layer showing such in-plane magnetization behavior, the Co—Cr film grows epitaxially on the soft magnetic layer to provide an excellent perpendicular magneto-anisotropic film with undisturbed crystal orientation. Thus, such laminated film constitutes a composite film of an in-plane magnetized soft magnetic layer and an excellent perpendicular magneto-anisotropic recording layer, so that the amount of free magnetic pole generated on the rear side of the perpendicular magneto-anisotropic recording layer is greatly reduced while the perpendicular component (the component in the direction vertical to the film surface) of the recording magnetization is enlarged owing to the decrease of demagnetizing field, resulting in an increased reproducing output.

The M content in the Co—M layer is preferably in the range of about 2 to 20 atomic %. When the M content exceeds this range, the effect of reducing the amount of free magnetic pole formed on the rear side of the Co—Cr perpendicular magneto-anisotropic layer is weakened due to the decrease of saturation magnetization.

A Co—M soft magnetic layer has a high effect of enhancing crystal orientability, so that when a Co—M film is used as the soft magnetic layer, it is possible to laminate the perpendicular magneto-anisotropic recording layer directly thereon with no need of interposing a non-magnetic intermediate layer therebetween.

In the magnetic recording medium of this invention, a non-magnetic sublayer may be interposed between the non-magnetic substrate and the soft magnetic layer. An effect of interposition of such a non-magnetic sublayer is to shut off the gas produced from the substrate surface during formation of the soft magnetic layer to improve its magnetic properties. Also, in case of using for instance a permalloy as the material of the soft magnetic layer and Co—Cr as the material of the vertical magneto-anisotropic recording layer, when a Ti layer having an hcp structure is provided as a base of permalloy, the <111> plane of permalloy grows on the c plane of the Ti base, which facilitates the growth of c plane of Co—Cr on the <111> plane to improve c-axis orientability of the Co—Cr layer.

The non-magnetic sublayer, soft magnetic layer, non-magnetic intermediate layer and perpendicular magneto-anisotropic recording layer in the magnetic recording medium of the present invention can all be formed by a commonly used deposition method such as vapor deposition. Of course, other film forming methods are also usable.

Vapor deposition referred to herein is a technique for depositing a material or a compound thereof in the form of vapor or ionized vapor on a substrate in a gaseous atmosphere or a vacuum. This technique includes the following methods: vacuum deposition, sputtering, ion plating, ion beam deposition, cluster ion beam deposition, CVD, and plasma polymerization.

As the non-magnetic substrate used in the magnetic recording medium of the present invention, there can be employed a film of a high-molecular material such as polyimide, polyethylene terephthalate, etc., a plate of glass, ceramic or a metal such as aluminum, anodized aluminum, brass, etc., a Si single crystal plate, a Si single crystal plate having its surface subjected to a thermal oxidation treatment, and the like. If necessary, this non-magnetic substrate may be provided with a grinding sublayer such as a nickel-phosphorus alloy layer or an anodized aluminum treated layer for conducting planer grinding or texturing.

The magnetic recording media provided according to this invention include magnetic tapes or magnetic discs having a substrate of a synthetic resin film such as polyester film, polyimide film, etc., magnetic discs or magnetic drums using as substrate a disc or drum made of a synthetic resin film, aluminum plate, glass plate, etc., and various other forms of magnetic medium having a structure designed to move sliding on a magnetic head.

PREFERRED EMBODIMENTS

EXAMPLES

The magnetic recording medium of this invention will be described more particularly below by showing the embodiments thereof.

Example 1

On a 40 μm thick polyimide film substrate was deposited a Co—Cr film to a thickness of 100 Å by varying the Cr content of the Co—Cr film, and the Cr content dependency of the magnetic properties of the film was examined.

Figure 7:
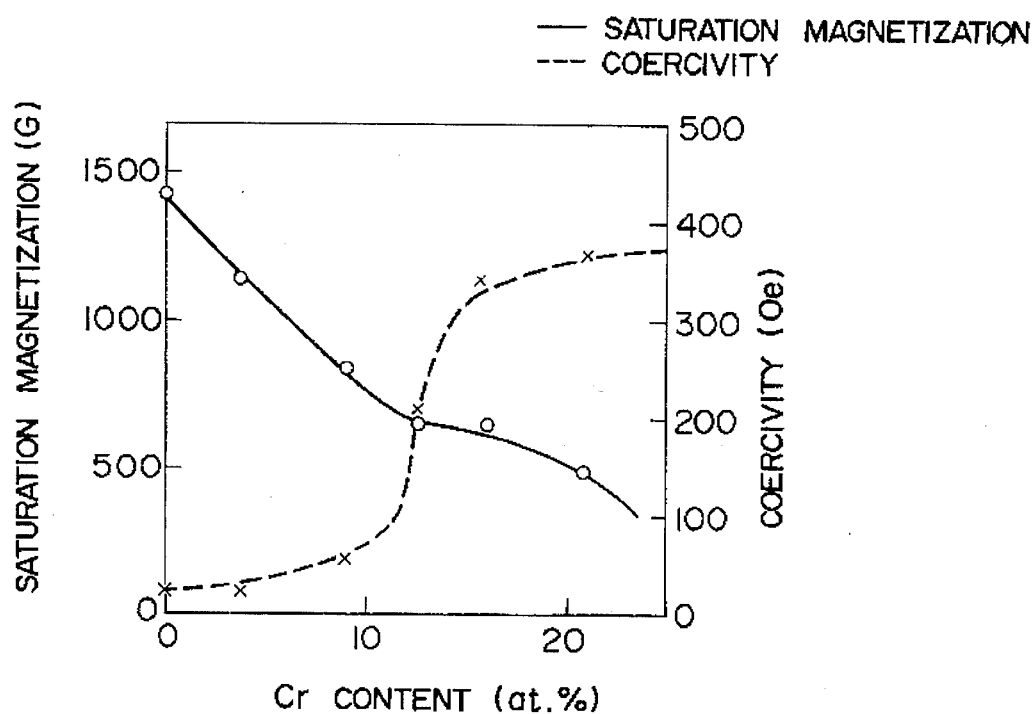
FIG. 7 includes characteristic curves showing the Cr content dependency of magnetic properties of a Co—Cr soft magnetic layer in the magnetic recording medium of Example 1.

The results are shown in FIG. 7. As seen from the characteristic curves shown in FIG. 7, when the Cr content is less than about 12 atomic % the film is low in coercive force and high in saturation magnetization.

Then, on the Co—Cr soft magnetic layer with a Cr content of 9 atomic % was continuously laminated a Co—Cr vertical magneto-anisotropic recording layer with a Cr content of 19 atomic % to a thickness of 0.15 μm. The thickness of the Co—Cr soft magnetic layer with a Cr content of 9 atomic % was varied within the range of 0 to 0.5 μm. Saturation magnetization of the soft magnetic layer was 800 G and that of the perpendicular recording layer was 550 G. A 3.5 inch disc was punched out from each of the thus prepared specimens and subjected to an evaluation test of recording and reproduction by using an amorphous ferrite composite type ring head (gap length: 0.21 μm). The results of determinations are shown in FIGS. 8 and 9.

Figure 8:
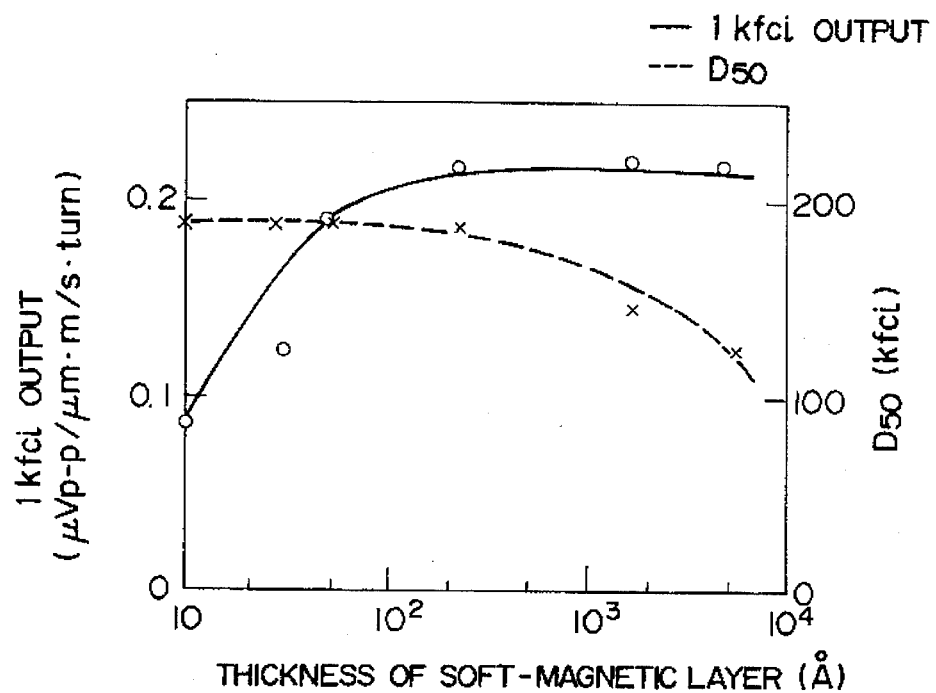
FIG. 8 includes characteristic curves showing the soft magnetic layer thickness dependency of the low-density output and high-density recording performance index $D_{50}$ in the magnetic recording medium of Example 1.

FIG. 8 shows the soft magnetic layer thickness dependency of the normalized reproducing output at a recording density of 1 K fci and the recording density $D_{50}$ at which the reproducing output at 1 K fci is reduced by half. It is noted from the drawing that the output increases as the thickness of the Co—Cr (9 atomic % Cr content) soft magnetic layer augments, and it approaches a saturation when the layer thickness becomes about 50 Å or greater. It is also seen that when the Co—Cr soft magnetic layer thickness exceeds 500 Å, $D_{50}$ lowers to deteriorate the high-density recording performance.

Figure 9:
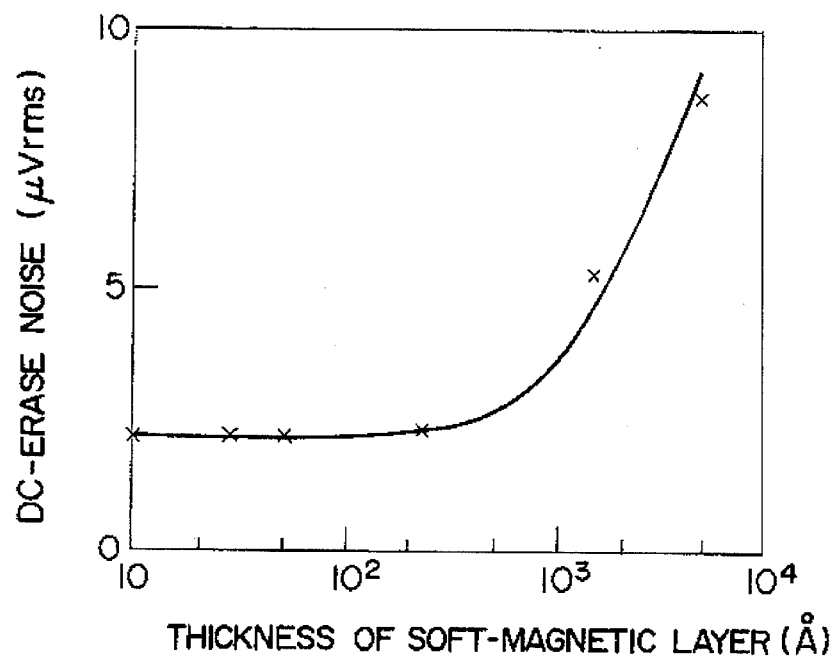
FIG. 9 is a characteristic curve showing the soft magnetic layer thickness dependency of DC erase noise in the magnetic recording medium of Example 1.

FIG. 9 shows the noise level on DC erase, from which it can be learned that the noise increases sharply when the Co—Cr soft magnetic layer thickness exceeds 500 Å.

These results teach that in case of using a Co—Cr soft magnetic layer with a Cr content of less than 12 atomic %, it is possible to obtain a high low-range output and an excellent high-density recording performance when the thickness of the soft magnetic layer is in the range of 50 to 500 Å.

Example 2

On a 40 μm thick polyimide film substrate was sputtered a Co—W film to a thickness of 200 Å by varying the W content of the Co—W film, and the W content dependency of the magnetic properties and the c-axis orientability of the hcp structure of the Co—W film was examined.

Figure 10:
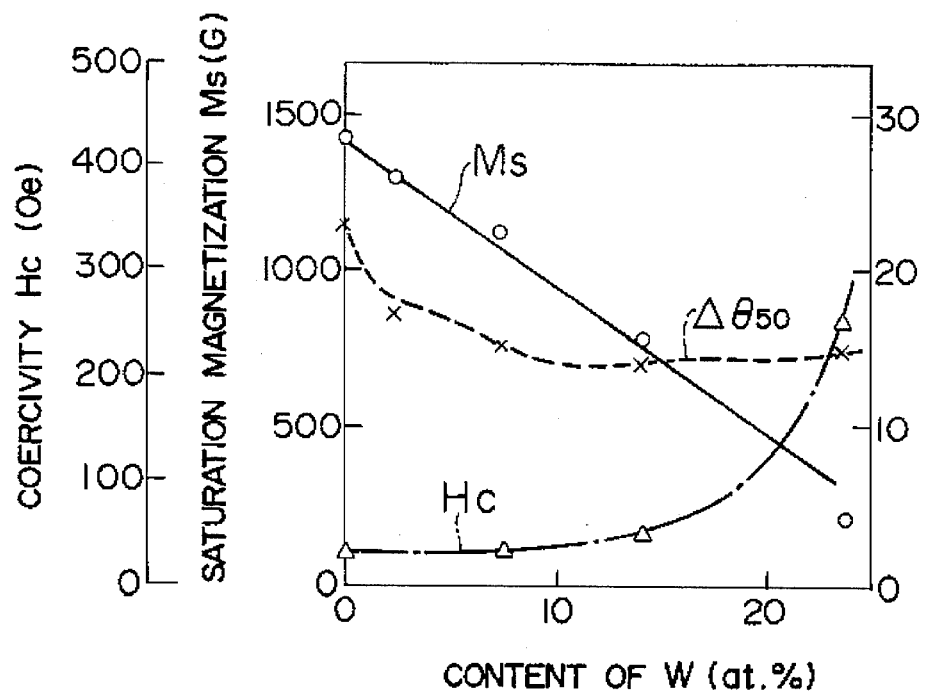
FIG. 10 includes characteristic curves showing the W content dependency of magnetic properties of a Co—W soft magnetic layer in the magnetic recording medium of Example 2

The results are shown in FIG. 10, in which $\Delta\theta_{50}$ indicates the half-value span of the rocking curve of the hcp (002) diffraction plane of the Co—W film. As seen from the characteristic curves of FIG. 10, there can be obtained a film high in saturation magnetization and crystal orientability and low in coercive force when the W content is in the range of 2 to 20 wt %. The similar tendency was observed when using other elements than W, such as Ge, Mo, Os, Pt, Re, Ru, Su, Si, Ta, V and Zn, and it was possible to form an excellent soft magnetic layer by using any of these elements in an amount range of 2 to 20 atomic % although there was seen a slight difference in optimal composition according to the element used.

Then, on the Co—W soft magnetic layer with a W content of 10.5 atomic % was continuously laminated a Co—Cr perpendicular magneto-anisotropic recording layer with a Cr content of about 18 atomic % to a thickness of 0.17 μm. The thickness of the in-plane magnetized sublayer was varied within the range of 0 to 0.5 μm. Saturation magnetization of the soft magnetic layer was 960 G and that of the perpendicular recording layer was 600 G. A 3.5 inch disc was punched out from each of the thus prepared specimens and subjected to an evaluation of recording and reproduction by using an amorphous ferrite composite type ring head (gap length: 0.16 μm). The results of determinations are shown in FIGS. 11 and 12.

FIG. 11 shows the soft magnetic layer thickness dependency of the standardized reproducing output at a recording density of 1 K fci and the recording density $D_{50}$ at which the reproducing output at 1 K fci is reduced by half. It is seen from this drawing that the output increases as the thickness of the soft magnetic layer augments, and it approaches a saturation when the layer thickness becomes about 50 Å or greater.

It is also seen that when the soft magnetic layer thickness exceeds 1,000 Å, $D_{50}$ lowers to deteriorate the high-density recording performance.

FIG. 12 shows the noise level on DC erase, from which it is noted that the noise increases sharply when the soft magnetic layer thickness exceeds 1,000 Å.

The above results dictate that in the case of the soft magnetic layer made of a Co—M alloy, M representing an element selected from the group consisting of Ge, Mo, Os, Pt, Re, Ru, Sb, Si, Ta, V, W and Zn, there can be obtained a high low-range output and an excellent high-density recording performance when the thickness of the soft magnetic layer is in the range of 50 to 1,000 Å.

Example 3

On a 50 μm thick polyimide film substrate were vacuum deposited Ti, $Ni_{91}$—$Fe_{19}$ and $Co_{77}$—$Cr_{23}$ successively to the thicknesses of 300 Å, 0–2,000 Å and 2,100 Å, respectively. The film forming operation was conducted under a vacuum of $2\times10^{-5}$ to $4\times10^{-6}$ Torr by adjusting the substrate temperature to 250° C. Saturation magnetization of the soft magnetic layer was 830 G and that of the perpendicular recording layer was 360 G. The magnetic properties of the Co—Cr film of each of the thus prepared specimens were determined from the Kerr effect, and the c-axis orientability of the hcp structure of the Co—Cr film was determined from the half-value span $\Delta\theta_{50}$ of the rocking curve of the (002) plane.

Figure 13:
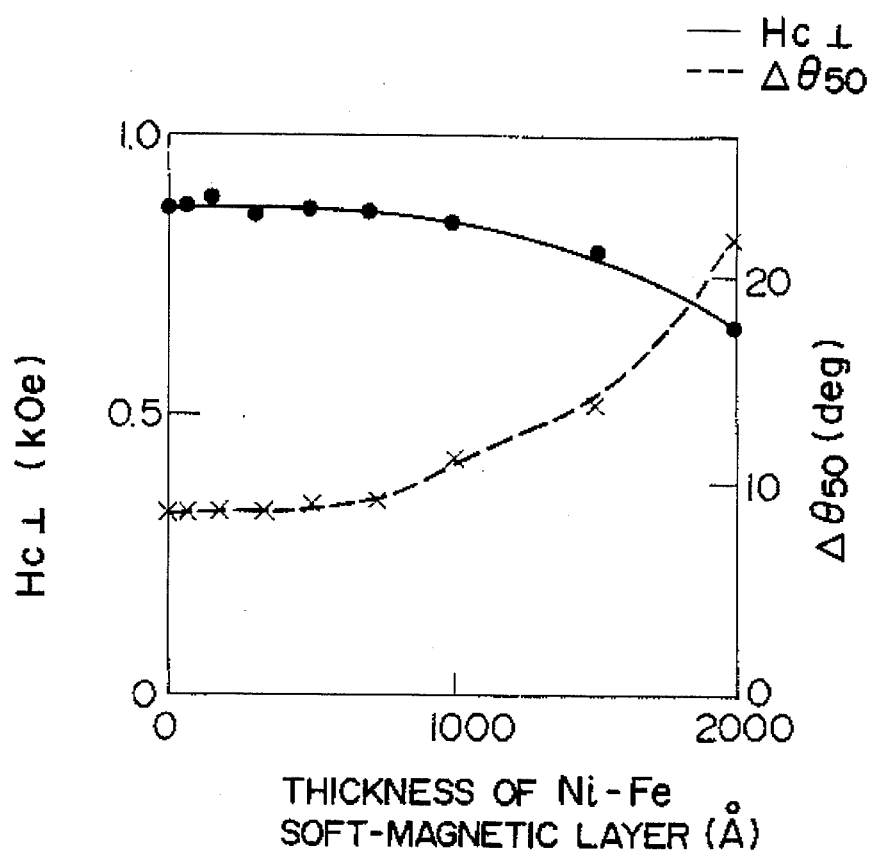
FIG. 13 is a characteristic diagram showing the Ni—Fe soft magnetic layer thickness dependency of coercive force $Hc\perp$ in the vertical direction of Co—Cr film and $\Delta\theta_{50}$.

FIG. 13 shows the Ni—Fe film thickness dependency of coercive force Hc⊥ in the perpendicular direction of the Co—Cr film and $\Delta\theta_{50}$. It is seen that $\Delta\theta_{50}$ increases while Hc⊥ lowers when the thickness of the Ni—Fe film reaches about 1,000 Å.

A 3.5 inch disc was punched out from each of the specimens and subjected to an evaluation of recording and reproduction by using an amorphous ferrite composite type ring head with a gap length of 0.19 μm. The results of evaluation of output S at a recording density of 10 kfci, noise level and recording density $D_{50}$ at which the output is reduced by half were shown in Table 1 below. Both output (S) and noise level (N) were given as 0 dB when the Ni—Fe film thickness was 0 Å.

TABLE 1

| Ni—Fe film thickness (Å) | S (dB) | N (dB) | $D_{50}$ (kFCI) |
| --- | --- | --- | --- |
| 0 | 0 | 0 | 165 |
| 50 | +3.8 | +0.08 | 171 |
| 150 | +3.9 | +0.08 | 167 |
| 300 | +3.9 | +0.12 | 170 |
| 500 | +4.0 | +0.15 | 160 |
| 700 | +4.0 | +0.6 | 138 |
| 1000 | +3.8 | +3.5 | 95 |
| 2000 | +3.5 | +6.0 | 60 |

From the results shown in Table 1, it is understood that a high output and high $D_{50}$ can be realized when the Ni—Fe film thickness is in the range of 50 to 500 Å, but the noise level elevates when the film thickness exceeds 500 Å.

Example 4

On a 50 μm thick polyimide film substrate were vacuum deposited Ti, $Ni_{91}$—$Fe_{19}$, Ge and $Co_{79}$—$Cr_{21}$ successively to the thicknesses of 300 Å, 100 Å, 0–1,000 Å and 1,600 Å, respectively, at a substrate temperature of 250° C. under a vacuum of $2\times10^{-5}$ to $4\times10^{-6}$ Torr. Saturation magnetization of the soft magnetic layer was 830 G and that of the perpendicular recording layer was 490 G. A 3.5 inch disc was punched out from each of the thus prepared specimens and subjected to the same recording and reproduction evaluation test as conducted in Example 1. The results are shown in Table 2 below. In the table, the output level was given as 0 dB when the Ge film thickness was 0.

TABLE 2

| Ge film thickness (Å) | S (dB) | $D_{50}$ (kFCI) |
| --- | --- | --- |
| 0 | 0 | 145 |
| 50 | +0.8 | 168 |
| 100 | +1.1 | 166 |
| 300 | +1.0 | 165 |
| 500 | +0.9 | 170 |
| 1000 | −2.5 | 163 |

As seen from the results shown in Table 2, the output is greatly lowered when the thickness of the Ge film constituting the non-magnetic intermediate layer exceeds 300 Å.

Example 5

On a 75 μm thick PET film was vacuum deposited Co, Ti and Co—O successively to the thicknesses of 0–1,000 Å, 150 Å and 2,500 Å, respectively. The film forming operation was conducted at a substrate temperature of 25° C. When forming the Co—O film, Co vapor was deposited from the direction perpendicular to the substrate surface under a fixed partial pressure of $4 \times 10^{-4}$ Torr by introducing $O_2$ gas into the vacuum chamber. Saturation magnetization of the soft magnetic layer was 1,400 G and that of the Co—O film of the perpendicular recording layer was in the range of 500 to 550 G. Evaluation of coercive force in the perpendicular direction and recording and reproducing characteristics was made in the same way as in Example 1. The results are shown in Table 3 below.

TABLE 3

| Co film thickness (Å) | S (dB) | N (dB) | $D_{50}$ (kFCI) |
|---|---|---|---|
| 0 | 0 | 0 | 146 |
| 30 | +2.1 | +0.12 | 148 |
| 50 | +4.3 | +0.12 | 145 |
| 100 | +4.4 | +0.14 | 145 |
| 300 | +4.4 | +0.13 | 147 |
| 500 | +4.3 | +0.17 | 143 |
| 700 | +4.2 | +1.2 | 116 |
| 1000 | +3.4 | +5.3 | 89 |

In the above table, the output level (S) at 10 kfci was assumed to be 0 dB when the thickness of the Co soft magnetic layer was 0.

The results of Table 3 show that the output lowers and the noise level elevates when the thickness of the Co soft magnetic layer becomes about 1,000 Å.

As described above, in the magnetic recording medium of this invention, saturation magnetization of the soft magnetic layer is higher than that of the magneto-anisotropic perpendicular recording layer, and by selecting the thickness of the soft magnetic layer from within the range of 50 to 1,000 Å, it is possible to phenomenally increase the reproducing output without impairing the high-density recording performance.

Further, in the present invention, a protective layer composed of B or a B-based compound is provided on the magnetic recording surface, and on the protective layer is provided a lubricant layer composed of a perfluoropolyether having at its molecular chain end a 5-member, 6-member or 7-member heterocyclic ring having at least one N and also containing therein at least one double bond. Such protective and lubricant layers can greatly improve the durability and corrosion resistance of the film type magnetic recording media.

The protective layer can be formed by depositing B or a B-based compound by an ordinary vapor deposition method such as vacuum deposition or sputtering. The thus formed thin film is compact and has good continuity even though it is extremely thin in thickness, and such film has no "island structure" which is seen in the films made of other materials. The presence of such a compact and continuous protective film on the surface of the magnetic recording layer prevents the ambient gas from entering the recording layer to significantly improve corrosion resistance of the recording medium. B and B-based compounds have a nature that they can be easily formed into a thin film with high compactness and good continuity, so that they are suited for forming an excellent anticorrosive protective film. The film made of such material, beside its anti-corrosive effect, has an additional advantage that it is highly proof against damage by external forces owing to its high hardness. This property plays a very important role for protection of the magnetic layer, but at the same time it derives the problem that the film, because of its high hardness, tends to damage the magnetic head on which the film slides.

In order to avoid such damage of the magnetic head, it is desirable to provide a lubricant layer on the surface of the protective layer of the recording medium to preclude direct contact of the recording medium with the magnetic head. Research has been conducted for a lubricant having best compatibility with the protective layer made of B or a B-based compound and, as a result, found that the damage of the magnetic head can be minimized when using the lubricant a perfluoropolyether having its molecular chain end terminated with a 5-member, 6-member or 7-member heterocyclic ring having at least one N and also containing at least one double bond. This fact is considered attributable to the strong adsorption of the terminal functional group of the lubricant on the surface of the protective layer made of B or a B-based compound to insure long-time stable lubrication of the medium surface.

Figure 14:
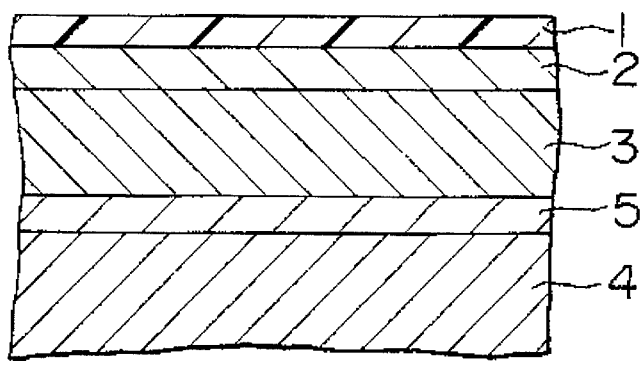
FIG. 14 is a partial schematic sectional view of a magnetic recording medium in an embodiment of the invention where a protective film is provided.

FIG. 14 shows the basic structure of the magnetic recording medium according to this invention. B or its carbide or nitride is preferably used as the material of the protective layer 2. The thickness of this layer is preferably in the range of 30 to 1,000 Å for the reason that a thickness less than 30 Å can not provide the desired dynamic strength to the protective layer while a thickness exceeding 1,000 Å may badly deteriorate the recording and reproducing characteristics of the recording medium due to a too much spacing loss. It is also desirable for the thickness of the lubricant layer 1 not to be greater than 1,000 Å. When its thickness exceeds 1,000 Å, the lubricant layer tends to become sticky to the magnetic head to hinder the sliding movement of the recording medium on the magnetic head. In the drawing, there is seen a magnetic recording layer 3, a substrate 4 and a soft magnetic layers.

An embodiment of the magnetic recording medium of this invention provided with a protective layer is described below.

On a 50 μm thick polyimide film substrate was sputtered a Co—W film to a thickness of 200 Å, and on this Co—W film were laminated successively a 2,500 Å thick Co—Cr film with a Cr content of 18 atomic % and a 200 Å thick B film by vacuum deposition. During the film forming operation, the substrate temperature was set at 140° C. By way of comparison, there were formed, instead of the B film, the C films and $SiO_2$ films by sputtering and the Si films and Ti films by vacuum deposition as the protective film.

Then these protective films were coated with perfluoro polyethers differing in terminal group as shown in Table 4 to form a 300 Å thick lubricant film.

Corrosion resistance of the thus prepared samples of magnetic recording medium was evaluated by leaving each sample in a 10 ppm $SO_2$ atmosphere (45° C., 70% RH) for 240 hours and determining the deterioration rate of saturation magnetization before and after the test. Durability was evaluated by subjecting each sample to recording and reproducing operations by using a 5.25 inch floppy disc drive and counting the number of times each sample could pass the magnetic head in sliding contact therewith before the initial output dropped to 70%. The magnetic head used for this evaluation was an amorphous ferrite composite head with a gap length of 0.3 μm. The results of evaluations are shown in Table 4.

It is seen from Table 4 that excellent durability and corrosion resistance can be realized by the combination of a protective film of B and a lubricant film of a pyridyl-terminated perfluoro polyether.

TABLE 4

| Protective film (thickness) | Terminal group of lubricant | Saturation magnetization deterioration rate (%) | Number of times the samples passed the magnetic head (×10³) |
|---|---|---|---|
| — | — | 38 | <1 |
| B(200 Å) | — | 5 | 50 |
| " | Pyridyl | 3 | 3000< |
| " | Isocyanate | 3 | 1200 |
| " | Carboxyl | 5 | 450 |
| " | Hydroxyl | 4 | 220 |
| " | Perfluoroalkyl | 3 | 250 |
| " | Ester | 3 | 270 |
| C(200 Å) | — | 17 | 90 |
| " | Pyridyl | 12 | 2300 |
| " | Isocyanate | 13 | 1700 |
| " | Carboxyl | 17 | 780 |
| " | Hydroxyl | 12 | 480 |
| C(200 Å) | Perfluoroalkyl | 13 | 420 |
| " | Ester | 14 | 590 |
| Si (200 Å) | Pyridyl | 13 | 1200 |
| " | Carboxyl | 15 | 210 |
| SiO₂ (200 Å) | Pyridyl | 22 | 350 |
| " | Carboxyl | 26 | 140 |
| Ti (200 Å) | Pyridyl | 29 | 130 |
| " | Carboxyl | 31 | 180 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium for use in recording and reproducing signals by a ring-head magnetic head comprising a non-magnetic substrate, a soft magnetic layer formed on the substrate, and a perpendicular magneto-anisotropic recording layer laminated on the soft magnetic layer, said magneto-anisotropic recording layer having a thickness of 500 Å to 3000 Å and comprises a Co—Cr alloy with a Cr content of 15 to 25 atomic %, said soft magnetic layer being made of material such that a saturation magnetization of said soft magnetic layer will be higher than that of said recording layer, the thickness of said soft magnetic layer being in the range of from 50 to 500 Å, said soft magnetic layer being selected from a film having a hcp structure of Ni—Fe permalloy film having a <111> plane orientation and including a Ti-sublayer having an hcp structure, a Co film and a Co—M alloy film having a C-axis, wherein M represents an element selected from at least one member of the group consisting of Cr, Ge, Mo, Os, Pt, Re, Ru, Sb, Si, Ta, V, W, and Zn, and wherein the <111> plane of or the C-axis of the permalloy film is oriented in a direction vertical to the film surface.

2. A magnetic recording medium according to claim 1, wherein said soft magnetic layer comprises a Co—M alloy, the M content in said Co—M alloy ranging from 2 to 20 atomic %.

3. A magnetic recording medium according to claim 1, wherein said recording medium includes a non-magnetic intermediate layer interposed between the recording layer and said soft magnetic layer, said intermediate layer having a thickness of 300 Å or less composed of a single element selected from one member of the group consisting of B, C, Ge, Mo, Si, Os, Ru, Re, Ta, Ti and W, or an alloy, oxide or nitride of said elements.

4. The magnetic recording medium of claim 1, wherein said soft magnetic layer is selected from one of a Co and Co—M film, the recording medium further including a non-magnetic sublayer between said non-magnetic substrate and one of said Co and Co—M soft magnetic layer.

5. A magnetic recording medium according to claim 1, wherein said soft magnetic layer comprises a Ni—Fe permalloy film including the Ti-sublayer and the magneto-anisotropic recording layer comprises Co—Cr alloy.

6. A magnetic recording medium according to claim 1, wherein the soft magnetic layer is composed of a Co—Cr alloy in which the Cr content is not greater than 12 at %.

7. A magnetic recording medium comprising a non-magnetic substrate, a soft magnetic layer formed on said substrate and a perpendicular magneto-anisotropic recording layer laminated on said soft magnetic layer, said soft magnetic layer having a saturation magnetization higher than that of said perpendicular magneto-anisotropic recording layer, and having a thickness of 50 Å to 500 Å.

8. The magnetic recording medium of claim 7, wherein said recording medium further includes a non-magnetic sublayer between said non-magnetic substrate and said soft-magnetic layer.

9. A magnetic recording medium according to claim 7, wherein said soft magnetic layer comprises a Co—M alloy, wherein M represents an element selected from at least one member of the group consisting of Cr, Ge, Mo, Os, Pt, Re, Ru, Sb, Si, Ta, V, W, and Zn, the M content in said Co—M alloy ranging from 2 to 20 atomic %.

10. A magnetic recording medium according to claim 7, wherein said recording medium includes a non-magnetic intermediate layer, said intermediate layer having a thickness of 300 Å or less and being composed of a single element selected from one member of the group consisting of B, C, Ge, Mo, Si, Os, Ru, Re, Ta, Ti and W, or an alloy, oxide or nitride of said elements.

11. The magnetic recording medium of claim 7, wherein said soft magnetic layer is selected from one of a Co and Co—M film, wherein M represents an element selected from at least one member of the group consisting of Cr, Ge, Mo, Os, Pt, Re, Ru, Sb, Si, Ta, V, W, and Zn, the recording medium further including a non-magnetic sublayer between the non-magnetic substrate and one of said Co and Co—M soft magnetic layer.

12. A magnetic recording medium according to claim 7, wherein said soft magnetic layer comprises a Ni—Fe permalloy film including a Ti-sublayer having an hcp structure and said magneto-anisotropic recording layer comprises Co—Cr alloy.

* * * * *